(12) United States Patent
Angelella et al.

(10) Patent No.: US 6,320,151 B1
(45) Date of Patent: *Nov. 20, 2001

(54) METHOD FOR ELECTRIC DISCHARGE MACHINING OF A WORKPIECE AND CORRESPONDING APPARATUS

(75) Inventors: Stefano Angelella, Quartino; Rino D'Amario, Taverne, both of (CH)

(73) Assignee: AGIE SA, Losone (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/451,578

(22) Filed: Nov. 30, 1999

Related U.S. Application Data

(63) Continuation of application No. PCT/EP98/07889, filed on Dec. 4, 1998, and a continuation of application No. 09/206,026, filed on Dec. 4, 1998.

(30) Foreign Application Priority Data

Dec. 4, 1997 (DE) .............................. 197 53 812

(51) Int. Cl.$^7$ .................. B23H 1/00; B23H 7/04
(52) U.S. Cl. ....................................... 219/69.12
(58) Field of Search .................. 219/69.12, 69.13, 219/69.17, 69.18

(56) References Cited

U.S. PATENT DOCUMENTS

| | | | |
|---|---|---|---|
| 3,859,186 | 1/1975 | Ullman et al. | 204/129.25 |
| 4,232,208 | 11/1980 | Bühler | 219/69.12 |
| 4,298,782 | 11/1981 | Wavre | 219/69.17 |
| 4,773,030 | * 9/1988 | Delpretti | 219/69.17 |
| 4,970,362 | * 11/1990 | Ono | 219/69.12 |
| 5,149,931 | 9/1992 | Magara | 219/69.13 |
| 5,233,147 | * 8/1993 | Magara | 219/69.12 |
| 5,824,986 | * 10/1998 | Derighetti et al. | 219/69.12 |
| 5,852,269 | * 12/1998 | Toyonaga et al. | 219/69.12 |

FOREIGN PATENT DOCUMENTS

| | | | |
|---|---|---|---|
| 650 433 | 7/1985 | (CH) . | |
| 657553 | * 9/1986 | (CH) | 219/69.12 |
| 2 250 872 | 3/1974 | (DE) . | |
| 28 26 270 A1 | 6/1978 | (DE) . | |
| 40 11 752 A1 | 10/1990 | (DE) . | |
| 0 067 229 | 12/1982 | (EP) . | |
| 2 427 167 | 12/1979 | (FR) . | |
| 54-109698 | 8/1979 | (JP) . | |
| 63-216631 | 8/1988 | (JP) . | |
| 63-229227 | 9/1988 | (JP) . | |
| 63-312020 | 12/1988 | (JP) . | |
| 9-248717 | 9/1997 | (JP) . | |
| 5-69230 | * 3/1993 | (JP) | 219/69.18 |

OTHER PUBLICATIONS

Dierberger et al., "A New MOSFET Equipment 1kW Amplifier Pallet, for 13.56 MHz Applications, with a Galvanically Isolated and Power Factor Corrected 300 VDC Bus," Power Conversion '96, pp. 77–84 (May 1996).

\* cited by examiner

Primary Examiner—Geoffrey S. Evans
(74) Attorney, Agent, or Firm—Marshall, Gerstein & Borun

(57) ABSTRACT

A method and apparatus for wire cutting electric discharge machining to achieve precise surfaces with $R_a<0.1$ microns. An intermittent operation is used with erosion pulses for primarily machining and erosion pulses for measuring any excursion of the wire electrode from the rest position. An evaluation unit is used to determine any excursions of the wire electrode from the rest position that might have been present during the preceding machining time, and a controller controls the machining process so that the wire electrode is practically straight during electroerosion.

17 Claims, 7 Drawing Sheets

——————— Wire electrode in an erosion position
- - - - - - - Wire electrode in the transitional region between erosion and recording
— — — — Wire electrode in the rest position; recording $F_{erosion} > F_{electrostatic}$
(Erosion)

$F_{erosion}$ quasi = Zero
(Measurement period)

$F_{erosion} < F_{electrostatic}$
(Erosion)

$F_{erosion}$ quasi = Zero
(Measurement period)

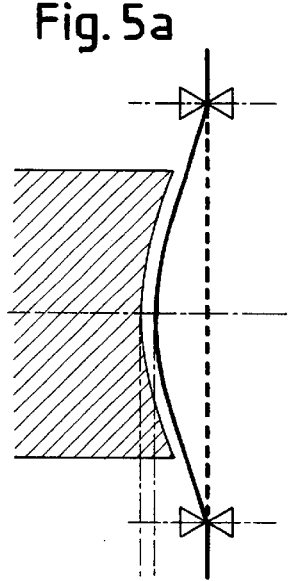
Fig. 5a
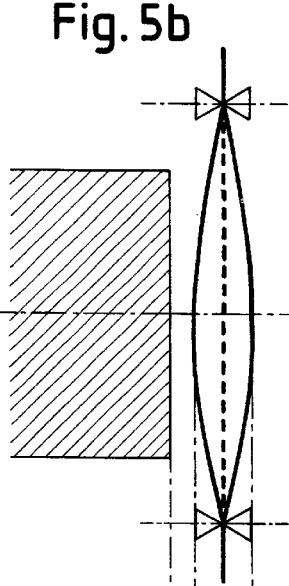
Fig. 5b
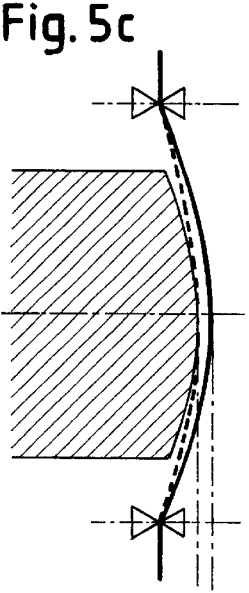
Fig. 5c
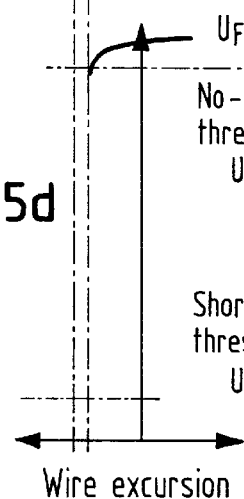
Fig. 5d
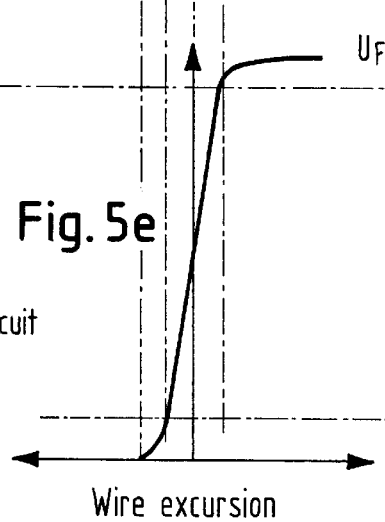
Fig. 5e
No-load threshold $U_{SK}$
Short-circuit threshold $U_{SK}$
Fig. 5f
Wire excursion
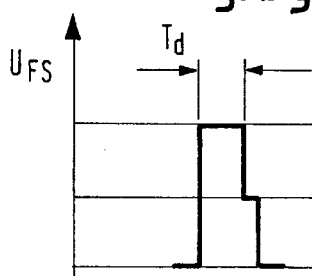
Fig. 5g
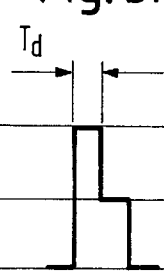
Fig. 5h
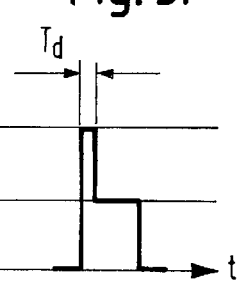
Fig. 5i

METHOD FOR ELECTRIC DISCHARGE MACHINING OF A WORKPIECE AND CORRESPONDING APPARATUS

RELATED APPLICATIONS

This patent is a continuation of co-pending international application PCT/EP98/07889, filed Dec. 4, 1998 and a continuation of U.S. patent application Ser. No. 09/206,026, now pending filed Dec. 4, 1998 which is hereby incorporated herein by reference in its entirety.

FIELD OF THE INVENTION

The invention concerns a method and apparatus for the most precise possible electrical discharge machining (EDM) of a workpiece by means of a wire electrode.

The purpose of the invention is to improve known electrical discharge machining methods with short pulses and low current intensities, so that very precise machining is made possible, in addition to high surface quality.

BACKGROUND OF THE INVENTION

Cavity-sinking or wire electric discharge machining is now already state-of-the-art with excellent surface quality of $R_a$ less than 0.1 µm and a material effect on the surface with a depth of less than 1 µm. Such machining requires generators that produce monopolar or bipolar pulses in the megahertz range with current intensities of a few amperes, in which the electrostatic forces $F_E$ and the erosion forces $F_P$ (plasma forces) during machining are of the same order of magnitude.

It is known that during electrical discharge machining the electrical resistance of the spark gap can be determined by means of a measurement current source during additionally generated periodic pauses between pulse groups and the servo drive, rinsing device and generator controlled with it (CH 650 433). This method has the task of determining the degree of contamination and discharge concentrations from the electrical resistance during cavity-sinking, and controlling the process with these values so that higher removal performance is achieved during unsupervised operation.

OBJECTS OF THE INVENTION

The task of the invention is to improve electrical discharge machining, and especially fine electrical discharge machining, so that the highest possible shape trueness can be achieved on the workpiece. During final cutting with wire electrodes, shape tolerances, corner errors and vertical profiles of better than 1 µm are to be achieved. During full cutting with fine wires in the range from 100 µm to 10 µm diameter, a significantly better shape tolerance is to be achieved, despite higher removal performance.

The advantages of the invention consist especially of the fact that each excursion of the wire electrode from the rest position is determined as accurately as possible and can be controlled. The erosion process thus becomes controllable in the micrometer range.

Another advantage is that the process values, i.e., the entirety of all adjustment parameters for a specific operation, can be determined in a much shorter time, since numerous interdependencies no longer need be considered.

Moreover, the additional investment in comparison with the benefit is limited, and it is even possible to retrofit already existing installations according to this concept.

Other advantages of the embodiment of the invention follow from the subsequent description of preferred practical examples.

BRIEF DESCRIPTION OF THE FIGURES

The description makes reference to the schematic figures. In the figures:

FIGS. 5a–5i show three typical situations of erosion, the spark gap voltage as a function of wire excursion and the trend of the ignition delay time.

DESCRIPTION OF THE PREFERRED EMBODIMENTS

It is known that the electrostatic force, the force of the plasma and the restoring force, as can be shown with reference to FIG. 7, cooperate as the most significant forces in the erosion process. The electrostatic force $F_E$ is attributed to the capacitor effect of the electrode-workpiece arrangement. This force is proportional to the square of the voltage and diminishes with increasing gap width. The electrostatic force is always attractive. The force of the plasma $F_P$ develops owing to the pressure of the dielectric vapor prevailing in the work gap and acts on the electrode. The force of the plasma is always repulsive. Finally, there is the restoring force $F_R$, which is attributable to the mechanical wire tension. This brings the electrode into the neutral rest position. It is sometimes attractive, sometimes repulsive, depending on the excursion direction of the electrode from the neutral voltage-free position, with reference to the process.

All additional known forces (see R. Panschow "Forces and Their Effects During Electrical Discharge Cutting with a Wire Electrode", dissertation, Hannover Technical University, 1974) are much smaller. In precision machining, for example, during final cutting in wire erosion, these forces have almost no significance.

Figure 7A:
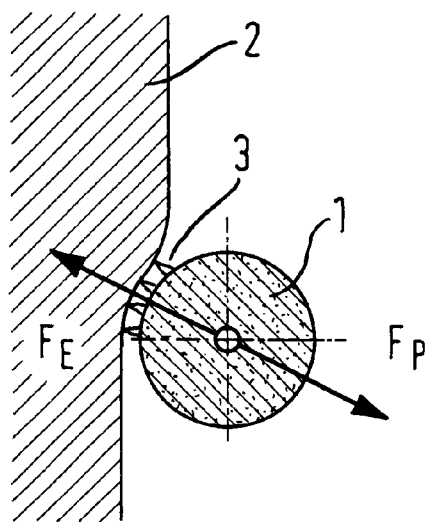
FIG. 7a shows the forces on the wire during fine machining ($F_P \approx F_E$; $F_R \approx 0$)
Figure 7B:
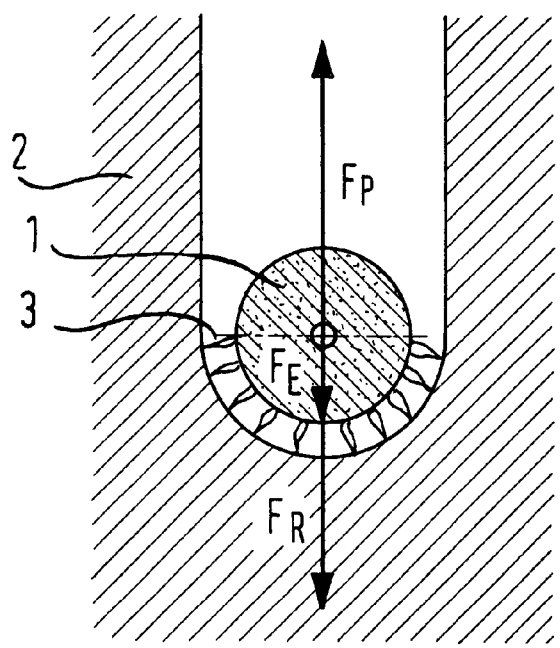
FIG. 7b shows the forces on the wire during full cutting ($F_P = F_E + F_R$)

FIG. 7a shows the forces on the wire during precision machining. The invention achieves a situation in which the force of plasma $F_P$ is roughly the same as the electrostatic force $F_E$, i.e., the restoring force $F_R$ practically disappears (i.e., the wire is approximately straight). FIG. 7b shows the case of a full cut, in which no use of the invention is made to achieve a high cutting speed and the wire is therefore generally bent. The force of the plasma $F_P$ is equal to the sum of the electrostatic force $F_E$ and restoring force $F_R$. However, it is also possible to employ the invention during full cutting so that the force of the plasma $F_P$ is also approximately equal to the electrostatic force $F_E$. The restoring force $F_R$ practically disappears and the wire is then approximately straight. This requires a lower cutting speed; due to the possibility of omitting subsequent precision cutting because of the no longer present wire bending, however, the overall machining time can be shortened.

In stationary operation, i.e., when the forces acting essentially in the erosion process vary much more frequently than the resonance period of the electrode, the position of the electrode is determined by time-related means, the vector sum of these forces. Consequently, the machining result, especially the shape accuracy of the workpiece, is also dependent on the resultant of the forces.

By changing erosion-typical generator parameters (pulse voltage, discharge current, pulse frequency, etc.), it is possible to generate a "bulged" vertical profile on the workpiece and nevertheless erode it stably on the wire EDM machine. The vertical profile on the workpiece, for example, for a workpiece height of 50 mm, can be influenced in the range from about −25 µm (concave vertical profile) to +15 µm (convex vertical profile) (see FIG. 2).

As already stated in the introduction, one of the main requirements in wire EDM is achievement of the lowest possible final roughness ($R_a \leq 0.1$ µm) This result can be achieved with very high pulse frequencies and very small pulse widths. The preceding assertion concerning influencing of the vertical profile also applies when the EDM unit is in high frequency operation.

Another main requirement during wire EDM is to maintain a shape accuracy on the order of a micrometer at the end of machining, i.e., after the last fine machining step.

It is an intrinsic property of erosion that the material, especially in the first working steps, is nonhomogeneously eroded in the corners and narrow curves. The erosion process must therefore be controlled accordingly. A more reliable starting value is required for this purpose, which offers a gauge for the amount of material to be instantaneously removed.

The measurement quantities thus far used for erosion in high frequency operation, however, have proven to be unsuitable in this respect, especially in critical situations, like rapid and sharp changes in direction. Precisely where this starting value is required the most, an unduly strong dependence on local geometric conditions has been established.

On the other hand, operation of the erosion unit with relatively low pulse frequencies poses no special problems for determination of a starting value, for example, the ignition delay time $T_d$. According to previous machining strategies, the quality objectives which shape accuracy and roughness are consequently achieved in succession. The machining sequence is broken down so that high shape accuracy with control in low-frequency operation is first achieved in one or more working steps, and then the final roughness is achieved in high-frequency operation at constant rate of advance.

One objective of the present invention is reduction of the total machining time, in which the quality objectives shape accuracy and roughness are simultaneously achieved. This objective is reached by appropriate adjustment of the generator parameters, this adjustment being based on a measurement that provides information concerning the direction of the instantaneous wire excursion and the amount of material to be removed as a result.

How determination of the instantaneous excursion direction of the wire electrode occurs is described below.

The stationary erosion process during high-frequency operation is suddenly interrupted at cyclic intervals, so that the erosion forces drop and only the restoring force $F_R$ just described acts. The electrode is moved into a new equilibrium position on this account, during which the wire electrode goes into natural oscillation. For this determination to be reliable, the time in which the electrode is freed from process forces must be of the same order of magnitude as the half period of the wire oscillation.

When the wire electrode during erosion has a stable, concave excursion relative to the vertical (convex vertical profile of the workpiece), it moves in the direction of the workpiece after interruption of the erosion pulse. The next erosion pulses then immediately establish a short-circuit situation, so that the rate of advance is immediately reduced by means of so-called servo control for the wire advance.

On the other hand, when the wire electrode during erosion has a stable convex excursion relative to the vertical (concave vertical profile of the workpiece), it moves away from the workpiece after interruption of the erosion pulse. The subsequent erosion pulses then immediately establish a no-load situation so that the rate of advance is immediately increased.

Under practical conditions, only three situations are therefore possible, namely: short-circuit, no-load or a virtually optimal range, in which very good verticality of the wire electrode is present. Consideration of these quantities is sufficient to determine the average rate of advance $V_S$ of the axes (FIGS. 5a–5i).

Once the erosion parameters are established with an essentially straight wire electrode, any further adjustments in rate of advance, because of previously generated geometric errors that occur intrinsically in relation to the process, are then carried out.

The ignition delay time $T_d$ has proven to be a reliable parameter to control rate of advance.

Figure 1A:
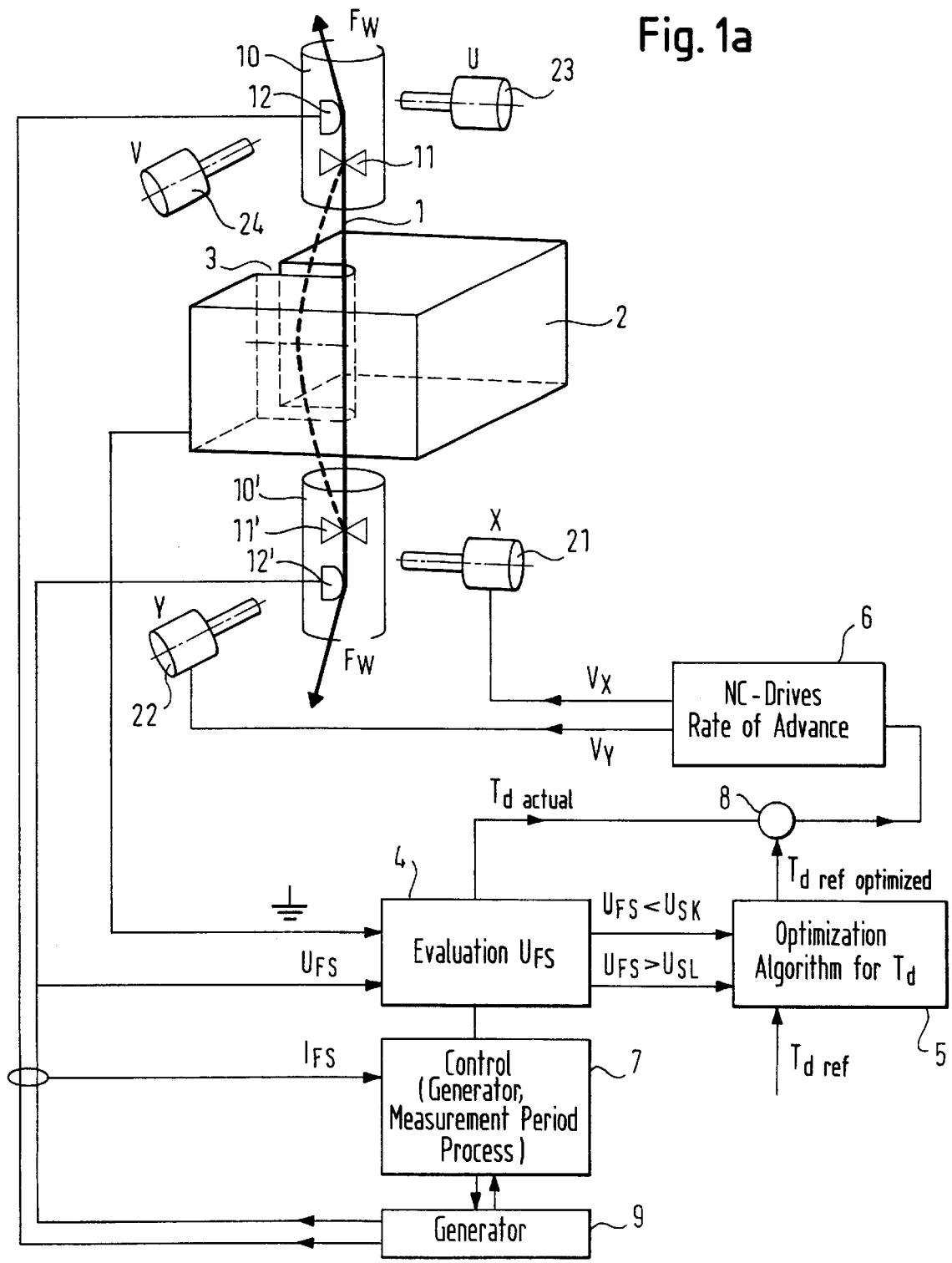
FIGS. 1a, 1b show two variants of the basic concept of the invention on the example of a wire cutting machine.
Figure 1B:
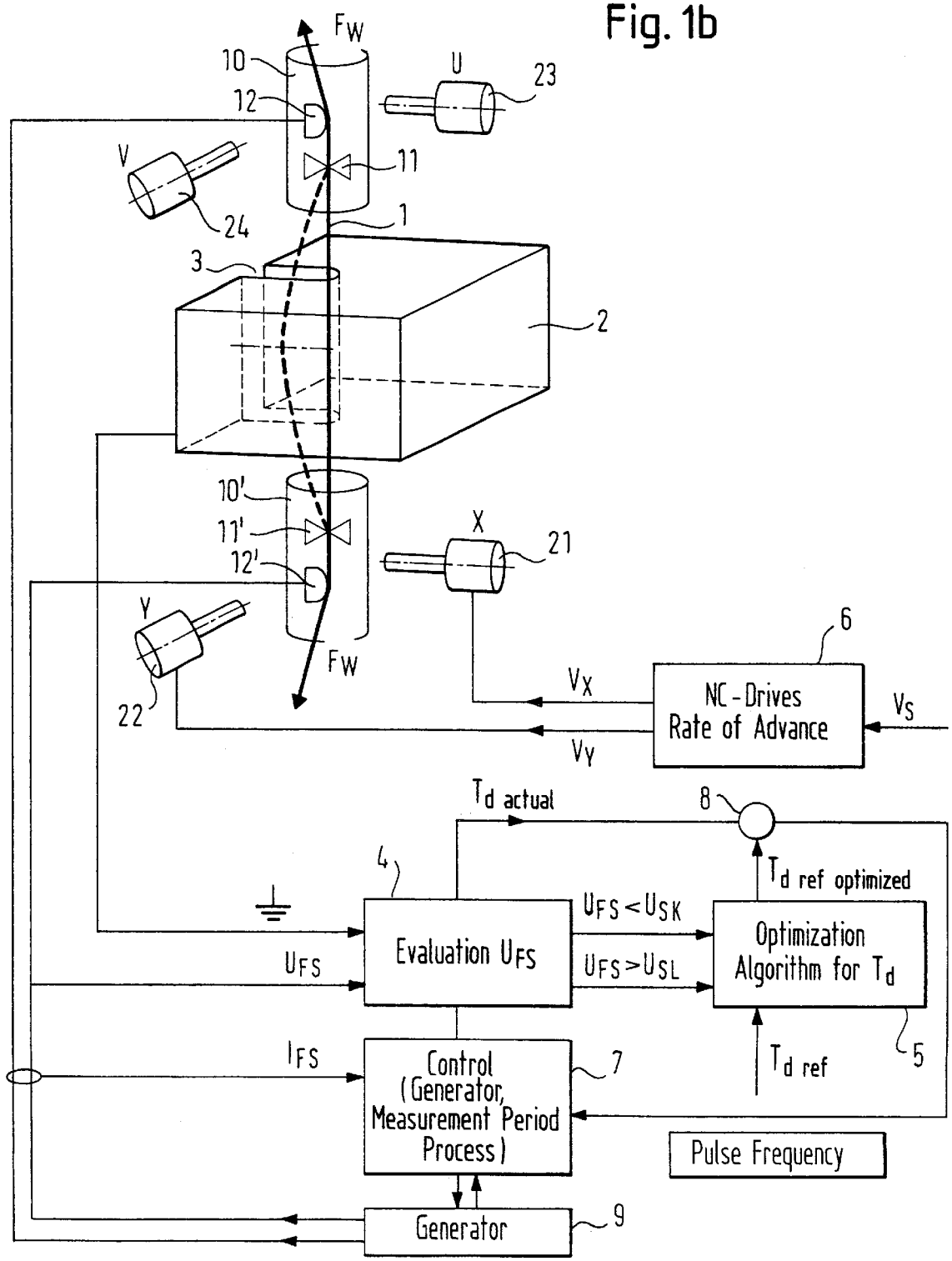

The basic concept for a wire cutting machine according to the invention is shown in FIGS. 1a and 1b. The spark gap signal F is taken off here by a lower guide head 10', but naturally can also be taken off on the upper guide head 10 or directly from the electrode 1.

Various components are not marked here, since they are not relevant to understanding of the method of functioning.

The method for evaluation of the spark gap voltage $U_{FS}$ is apparent from FIG. 1a. An evaluation unit 4 determines the % of measurement time MT that the spark gap voltage $U_{FS}$ falls short of a defined short-circuit threshold voltage $U_{SK}$ (for example, 5% of the no-load voltage) and classifies this as a short-circuit. It also determines the % of measurement time MT that the spark gap voltage $U_{FS}$ on average surpasses a defined no-load threshold voltage $U_{SL}$ (for example, 90% of the no-load voltage) and classifies this as no-load (see FIGS. 6c–6f).

Figure 6A:
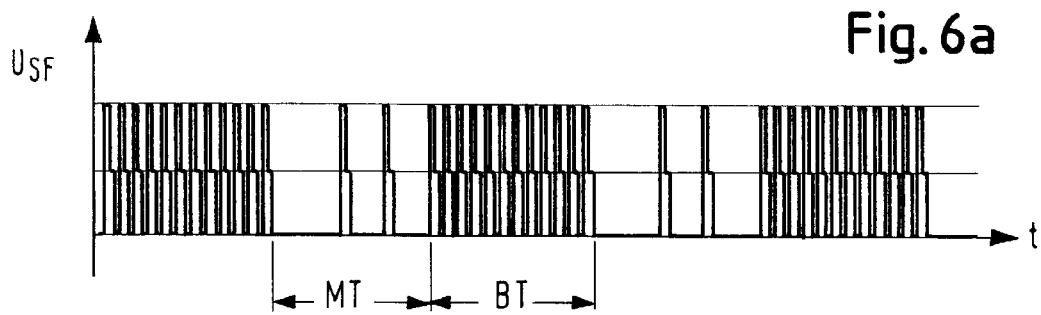
FIGS. 6a, 6b show the time trend of the spark gap voltage signals in FIG. 1 in two different time scales.
Figure 6B:
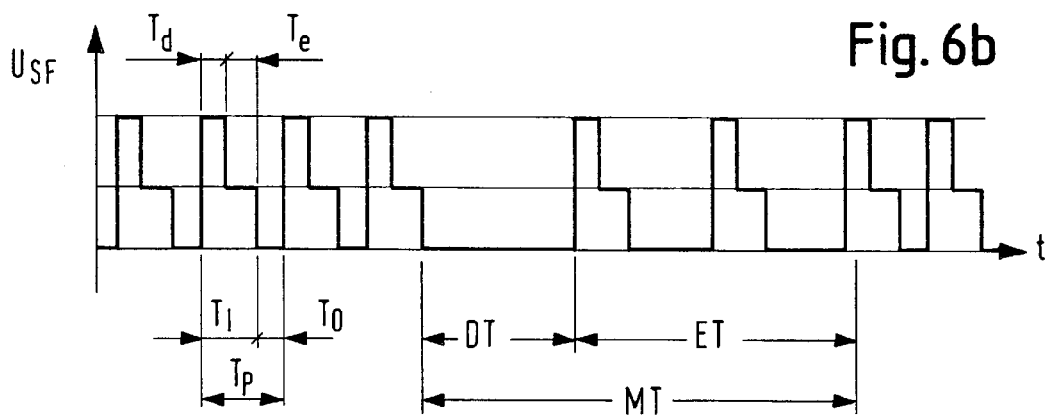
Figure 6C:
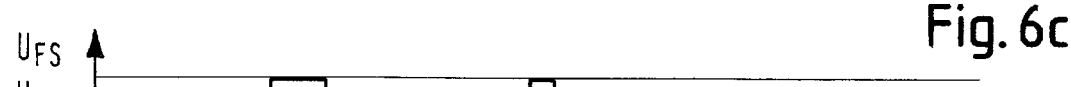
FIGS. 6c–6f show the time trend of the spark gap voltage and current for short-circuit, normal and no-load signals and the corresponding logic short-circuit and no-load signals.
Figure 6D:
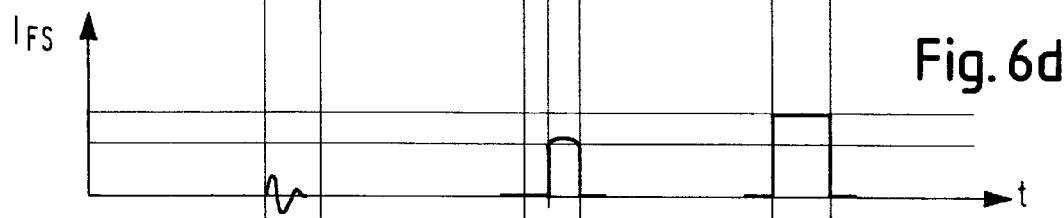
Figure 6E:
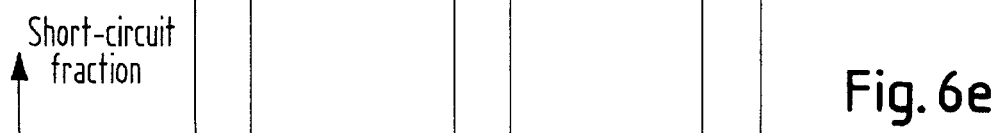
Figure 6F:
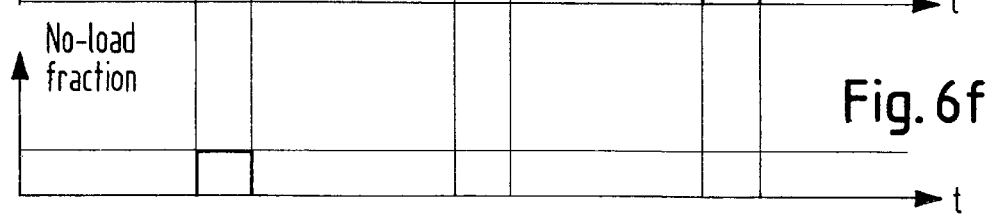

The spark gap voltage $U_{FS}$ is also used by evaluation unit 4 to determine a spark gap signal F (for example, the ignition delay time $T_d$ or the average spark gap voltage). The ignition delay time $T_d$ is preferred in the subsequent description (FIG. 6b).

The reference value of ignition delay time $T_d$ should be taken initially from the technology database. At the beginning of erosion, this reference value of the ignition delay time serves for advance control. In the course of erosion, this reference value is modified by an optimization unit 5, the value so produced being called the optimized reference value $T_{d\ ref,\ optimized}$ (will be explained further below).

Based on a comparison of the measured ignition delay time $T_{d\ actual}$ and $T_{d\ ref}$ or $T_{d\ ref,\ optimized}$, a servo controller with comparator 8 carries out the advance movements of wire electrode 1 relative to workpiece 2 via drive axes (X, Y) and/or additional drive axes (Z, U, V, A, B, C . . . ) by means of numerically controlled drive 6. If $T_{d\ actual}$ is smaller than $T_{d\ ref}$ or $T_{d\ ref,\ optimized}$, the rate of advance is increased and vice versa.

A control unit 7 controls the generator 9 to generate the erosion pulses. For this purpose, it receives signals from the evaluation unit 4 and measured values of the spark gap current $I_{FS}$.

Figures 2A, 2B, 2C:
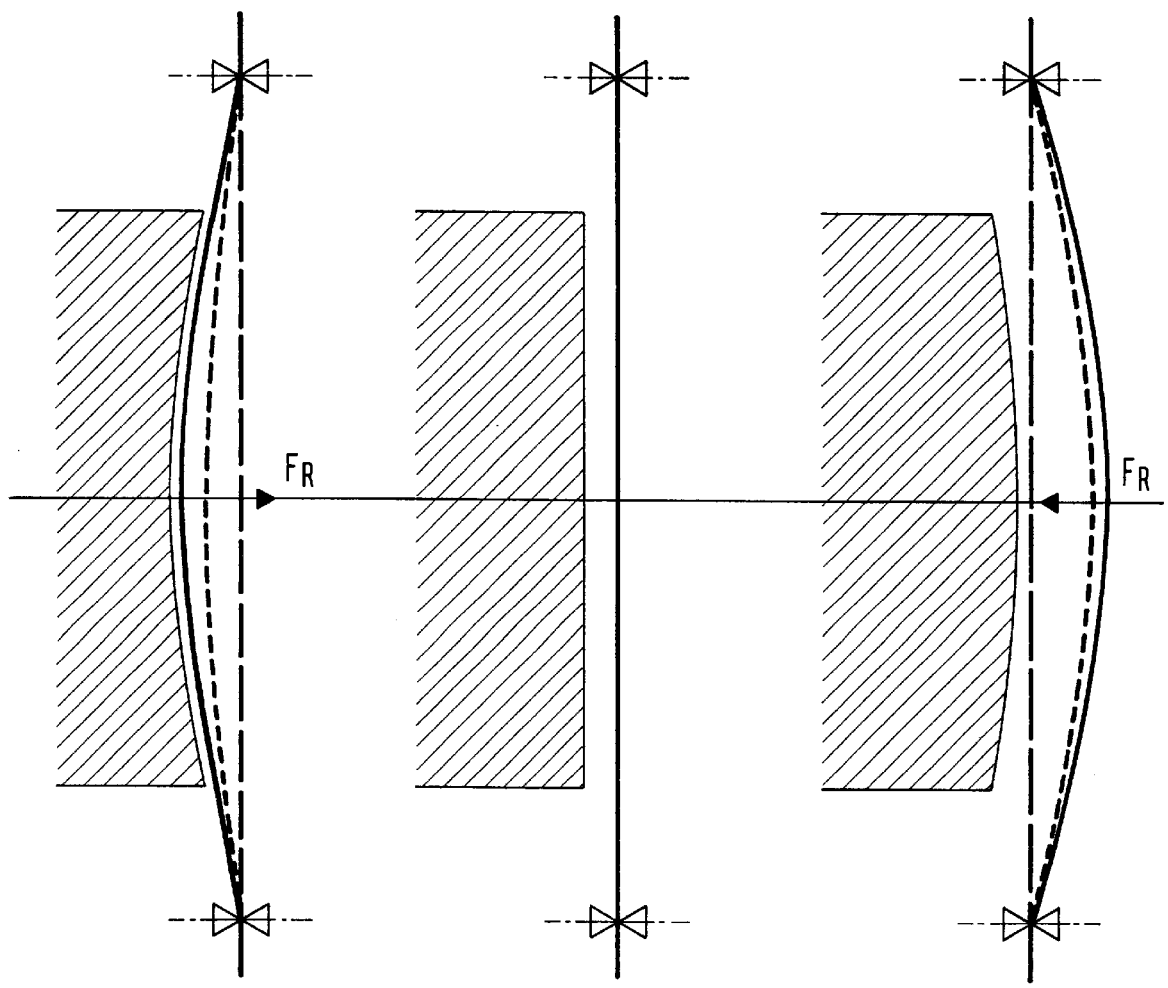
FIGS. 2a, b, c show three different situations during machining with a wire cutting machine.
Figure 3A:
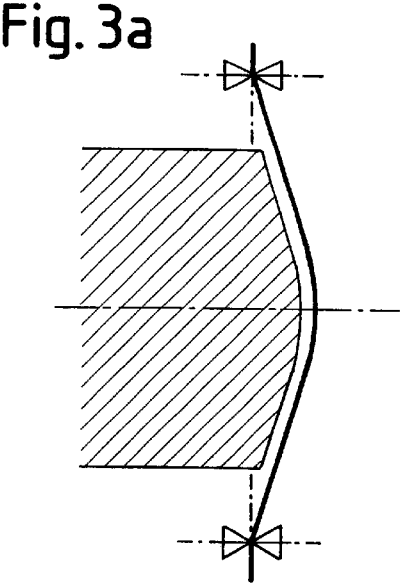
FIGS. 3a, b show convex workpiece profiles through insufficient material removal.
Figure 3B:
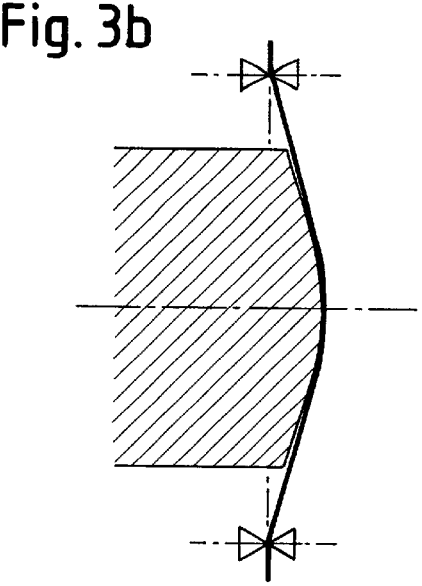
Figure 4A:
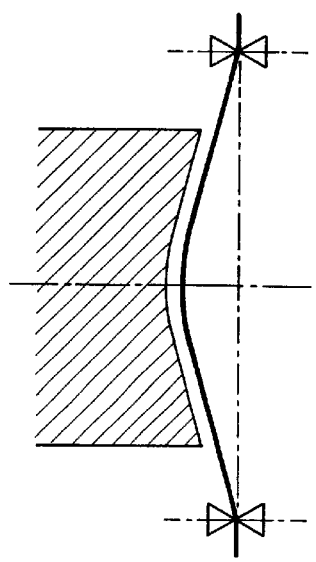
FIGS. 4a, b show concave workpiece profiles through excess material removal.
Figure 4B:
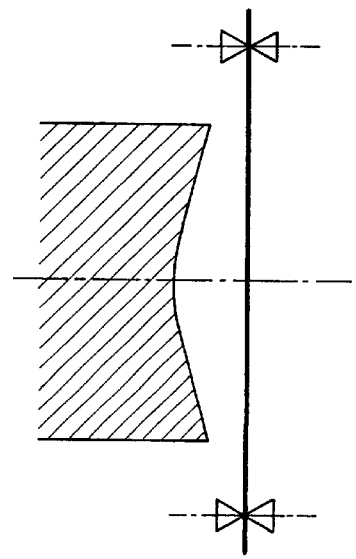

Three different situations during the machining time and during the measurement time in a wire cutting machine are explained with reference to FIG. 2.

Three scenarios (a, b, c) in vertical cutting through workpiece 2, electrode 1 and an upper and lower guide head 10, 10' are shown.

It is assumed that precision cutting or precision final cutting of workpiece 2 is to be carried out by precision machining with a required surface quality and roughness (for example, $R_a=0.1$ μm). For lack of significant input quantities, the workpiece contour in the prior art is ordinarily cut with a constant servo speed based on stored process data.

Scenario a shows machining of an outer corner of workpiece 2 or a zone where errors in the form of unduly large material removal were produced with precutting. The interesting thing now is that the usual EDM is not reduced in these zones, as expected, as a result of no-load, but instead is maintained with high stability because of the electrostatic forces $F_E$. Because of this, the wire electrode has a tendency to follow the profile.

Scenario b shows machining on a line of the contour, where precutting left behind no errors. Only in this case does a method according to the prior art provide acceptable results for accuracy.

Scenario c finally shows the commonly occurring machining of an inside corner of the contour or sites where too much material was left on the workpiece 2 as a result of errors during precutting. Here the electrode 1 deviates from the workpiece up to about 10 μm. Known servo systems in the best case would only slightly reduce the speed to maintain the reference value and not correct the convex geometry for lack of information.

In all three scenarios, stable electrical discharge machining prevails in the prior art, and no information can be gained in order to counteract the frequently increasingly larger errors.

Here the invention enters, in which the erosion pulses are cyclically interrupted and the electrode 1 is cyclically scanned in a recording time ET (FIGS. 6a, 6b) to determine how much material is actually removed and advance adjusted so this material is removed with an almost linear electrode. Normal machining before the corresponding interruption occurs with relatively high pulse frequency during a machining time BT. The recording time ET comprises a delay time DT, in which no voltage is applied, and a measurement time MT, in which, for example, pulses of the same height as the machining pulses, but with reduced pulse frequency (for example, with 0.05–0.8-fold frequency), are applied. The delay time permits wire 1 to move in the direction of the rest position. The pulses during the recording time ET enable the device to scan the now present restoring movements. FIGS. 5g to 5i, as well as FIGS. 6c to 6f, show the possible trend of ignition delay time $T_d$, the short-circuit fraction and the no-load fraction of the pulses during the recording time ET.

Control of advance is laid out, so that the case of a wire 1 not deviating from the rest position (FIGS. 5b, e, h) is sought.

In this case, we have equilibrium of the electrostatic forces $F_E$ and the erosion forces (plasma forces) $F_P$. This equilibrium of electrostatic forces and erosion forces can occur for each individual pulse or for a number of successive pulses. If equilibrium is guaranteed for a pulse sequence, then the period of the sequence must be shorter than the oscillation period of the wire electrode.

To achieve force equilibrium, the optimization unit 5 varies (optimizes) the reference value of the ignition delay time $T_{d\ ref}$ chosen from the process data by means of an optimization algorithm, so that the stochastically occurring fractions of the short-circuits ($U_{FS}<U_{SK}$) and the no-loads ($U_{FS}>U_{SL}$) during recording time ET become as small as possible. It increases the reference value of the ignition delay time with an unduly large short-circuit fraction, which leads to a reduction of the rate of advance. Vice versa, with an unduly large no-load fraction, it reduces the reference value of the ignition delay time, which leads to an increase in rate of advance. The wire excursion from the ideal position of FIGS. 5 b, e, h becomes minimal on this account.

It should be noted here that machining with interruption times for measurement purposes does not necessarily lead to power losses. For loading of the electrode, the average power is decisive, and the time loss can be compensated, for example, by increasing the frequency of the machining pulse of the generator.

Control unit 7 takes care of corresponding control of generator 9. It causes generator 9 to cyclically interrupt the pulse sequence of machining time BT and, in the inserted measurement times, to apply no pulses initially during the delay time DT, and then to apply pulses with reduced pulse frequency during the recording time ET, as shown in FIGS. 6a, 6b. The control unit 7 also provides the evaluation unit 4 with corresponding signals so that this can synchronize evaluation of the spark gap voltage $U_{FS}$ with the recording time ET or, if necessary, the pulses applied in this time.

FIG. 1b shows another variant of the invention, in which the rate of advance is not used as control quantity to control the process, but the pulse frequency of the machining pulse during machining time BT. The pulse parameters, the rate of advance $V_S$, as well as an initial value for pulse frequency, must be obtained from the prestored process values; the erosion process is controlled by changing this frequency. To control the pulse frequency, the aforementioned applies, with the stipulation that an increase (or reduction) of pulse frequency occurs, instead of a reduction (or increase) of the rate of advance. Optimization of the reference value of ignition delay time $T_{d\ ref}$ also occurs here according to the above comments.

FIGS. 6c to 6f schematically show, as mentioned already, the possible time trend of the spark gap voltage during the measurement time, as well as the type of evaluation, i.e., definition of the short-circuit time and no-load time, and the ignition delay time.

What is claimed is:

1. Method for electrical discharge machining of a workpiece by means of a wire electrode in the most precise possible machining process, characterized by the fact that:

machining occurs intermittently, in which erosion pulses are applied during machining times on the work gap and erosion pulses with a low repetition frequency are applied during measurement times lying in between, so that the wire electrode seeks its rest position because of the restoring force of wire tension during measurement time, and that any excursions of the wire electrode from the rest position that might have been present during the preceding machining time are determined in the micrometer range, and the machining process is controlled based on this, so that the wire electrode is practically straight during erosion.

2. Method according to claim 1, characterized by the fact that the changes in excursion of the wire electrode are recorded, in which a gauge for changes in the wire electrode-workpiece spacing is obtained during measurement time by evaluation of the spark gap signal and control of the erosion process occurs from this.

3. Method according to claim 2, characeed by the fact that the spark gap signal is the average ignition delay time or the average spark gap voltage.

4. Method according to claim 2, characterized by the fact that the erosion pulses are classified as "short-circuit" in the recording time, whose spark gap voltage falls short of a defined short-circuit threshold voltage.

5. Method according to claim 2, characterized by the fact that the erosion pulses are classified as "no-load" in the recording time, whose spark gap voltage surpasses a defined no-load threshold voltage.

6. Method according to claim 1, characterized by the fact that the recording time is synchronized with the measurement time, and the beginning of the recording time is delayed by a time, so that the wire electrode has started movement in the direction of its rest position.

7. Method according to claim 1, characterized by the fact that the erosion pulses are used in the recording time to derive at least one of the average ignition delay time $T_d$ and the average spark gap voltage, and this value is used as actual value for control of the erosion process.

8. Method according to claim 1, characterized by the fact that control of the erosion process occurs at constant erosion frequency (pulse frequency $f_p$) by control of advance.

9. Method according to claim 1, characterized by the fact that control of the erosion process occurs by control of the erosion frequency at constant rate of advance.

10. Method according to claim 1, characterized by the fact that the algorithm for control of the erosion process comprises an automatic adjustment to each workpiece height and geometry, which is based on minimization of wire movement between machining time and recording time.

11. Method according to claim 1, characterized by the fact that the optimal reference value of the average spark gap voltage or the average ignition delay time is determined to control the advance or erosion frequency by an algorithm that minimizes the short-circuit time and the no-load time.

12. Method according to claim 1, characterized by the fact that fuzzy logic is used to optimize process control.

13. Method according to claim 1, characterized by the fact that the excursions of the wire electrode are determined by a measurement of a value characterizing the machining process.

14. Method according to claim 13, wherein the value characterizing the machining process is representative of at least one of an ignition delay time, a short-circuit rate, and an average spark gap voltage.

15. Apparatus for electrical discharge machining of a workpiece by means of a wire electrode in the most precise possible machining process, characterized by:

a control of a pulse generator, which is set up so that machining occurs intermittently, during which the erosion pulses are applied during machining times on the work gap, and erosion pulses are applied during the measurement times lying in between with low repetition frequency, so that the wire electrode seeks its rest position by the restoring effect of wire tension during measurement time, an evaluation unit, which determines any excursion of the wire electrode from the rest position that might have been present during the preceding machining time in the micrometer range, and a controller which controls the machining process based on this, so that the wire electrode is practically straight during erosion.

16. Apparatus according to claim 13, characterized by the fact that the excursions of the wire electrode are determined by a measurement of a value characterizing the machining process.

17. Apparatus according to claim 16, wherein the value characterizing the machining process is representative of at least one of an ignition delay time, a short-circuit rate, and an average spark gap voltage.

* * * * *